United States Patent
Kobayashi

(10) Patent No.: US 10,511,789 B2
(45) Date of Patent: Dec. 17, 2019

(54) INFRARED IMAGING DEVICE, CONTROL METHOD THEREOF, AND VEHICLE

(71) Applicant: FUJIFILM Corporation, Tokyo (JP)

(72) Inventor: Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 64 days.

(21) Appl. No.: 15/950,394

(22) Filed: Apr. 11, 2018

(65) Prior Publication Data

US 2018/0234643 A1  Aug. 16, 2018

Related U.S. Application Data

(63) Continuation of application No. PCT/JP2016/080454, filed on Oct. 14, 2016.

(30) Foreign Application Priority Data

Oct. 27, 2015 (JP) .................................. 2015-210533

(51) Int. Cl.
*H04N 5/33* (2006.01)
*H04N 7/18* (2006.01)
(Continued)

(52) U.S. Cl.
CPC .............. *H04N 5/33* (2013.01); *G01J 5/0834* (2013.01); *G01J 5/10* (2013.01); *G08G 1/165* (2013.01);
(Continued)

(58) Field of Classification Search
CPC ........ H04N 5/33; H04N 5/353; H04N 5/3653; H04N 7/18; G01J 5/0834; G01J 5/10
See application file for complete search history.

(56) References Cited

U.S. PATENT DOCUMENTS

| 4,975,864 A | 12/1990 | Sendall et al. |
| 2011/0001830 A1* | 1/2011 | Egashira ............... G01J 5/08 348/164 |

(Continued)

FOREIGN PATENT DOCUMENTS

| JP | 62-124487 A | 6/1987 |
| JP | 3-504766 A | 10/1991 |

(Continued)

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/080454, dated May 11, 2018, with an English translation of the Written Opinion.

(Continued)

*Primary Examiner* — Obafemi O Sosanya
(74) *Attorney, Agent, or Firm* — Birch, Stewart, Kolasch & Birch, LLP

(57) ABSTRACT

A first imaging unit detects far-infrared rays and captures a first image. A second imaging unit detects light having a wavelength range shorter than a wavelength range of the far-infrared rays and captures a second image. An unevenness correction unit performs unevenness correction processing on the first image. A correction data acquisition unit acquires correction data for correcting unevenness. A light irradiation determination unit determines whether or not the second imaging unit is irradiated with light having a wavelength range captured by the second imaging unit. A control unit causes the correction data acquisition unit to acquire the correction data in a case where the light irradiation determination unit determines that light irradiation is not performed on the second imaging unit.

20 Claims, 7 Drawing Sheets

(51) Int. Cl.
*G01J 5/08* (2006.01)
*G01J 5/10* (2006.01)
*H04N 5/353* (2011.01)
*H04N 5/365* (2011.01)
*G08G 1/16* (2006.01)
*B60R 1/00* (2006.01)
*G01J 5/00* (2006.01)

(52) U.S. Cl.
CPC ............. *G08G 1/166* (2013.01); *H04N 5/353* (2013.01); *H04N 5/3653* (2013.01); *H04N 7/18* (2013.01); *B60R 1/00* (2013.01); *B60R 2300/103* (2013.01); *B60R 2300/301* (2013.01); *G01J 2005/0077* (2013.01)

(56) References Cited

U.S. PATENT DOCUMENTS

| | | |
|---|---|---|
| 2012/0062746 A1 | 3/2012 | Otsuka et al. |
| 2015/0373278 A1* | 12/2015 | Hattori .................. H04N 5/332 348/148 |

FOREIGN PATENT DOCUMENTS

| | | |
|---|---|---|
| JP | 2001-336983 A | 12/2001 |
| JP | 2002-310804 A | 10/2002 |
| JP | 2004-241818 A | 8/2004 |
| JP | 2007-214806 A | 8/2007 |
| JP | 2007-336288 A | 12/2007 |
| JP | 2008-174028 A | 7/2008 |
| JP | 2009-207072 A | 9/2009 |
| JP | 2010-272067 A | 12/2010 |
| JP | 2011-227657 A | 11/2011 |
| JP | 2011-252733 A | 12/2011 |
| JP | 2014-171214 A | 9/2014 |

OTHER PUBLICATIONS

International Search Report and English translation (Form PCT/ISA/210) for Application No. PCT/JP2016/080454, dated Jan. 10, 2017.

* cited by examiner

INFRARED IMAGING DEVICE, CONTROL METHOD THEREOF, AND VEHICLE

CROSS-REFERENCE TO RELATED APPLICATIONS

This application is a Continuation of PCT International Application No. PCT/JP2016/080454 filed on Oct. 14, 2016, which claims priority under 35 U.S.C § 119(a) to Japanese Patent Application No. 2015-210533 filed on Oct. 27, 2015. Each of the above application(s) is hereby expressly incorporated by reference, in its entirety, into the present application.

BACKGROUND OF THE INVENTION

1. Field of the Invention

The present invention relates to an infrared imaging device, and more particularly, to an infrared imaging device having an infrared detector that detects incident infrared rays and converts the detected infrared rays into electric signals. Further, the present invention relates to a control method of the infrared imaging device. Furthermore, the present invention relates to a vehicle having the infrared imaging device mounted thereon.

2. Description of the Related Art

An infrared imaging device that detects incident infrared light (infrared rays) and generates an infrared image has been known. In general, the infrared imaging device includes an infrared detector that detects infrared rays radiated from a subject and converts the detected infrared rays into electric signals. The infrared imaging device is used in various fields of a monitoring camera, a night vision device, thermography, or forward monitoring device mounted on a vehicle or an aircraft.

As an example in which the infrared imaging device is used in the vehicle, JP2007-336288A describes an obstacle detection system that detects an obstacle from an infrared image captured by a far-infrared imaging device. In JP2007-336288A, a region near the vehicle is captured in a sequence of time from multiple viewpoints by using the plurality of far-infrared imaging devices, and the presence of the obstacle on the image is detected from a parallax picture.

Here, in the far-infrared imaging device, fixed pattern noise specific to the device, such as a variation in sensitivity of the infrared detector, a gain of a circuit, or a variation in offset, is generated. Particularly, in the far-infrared imaging device using a two-dimensionally arranged focal plane array as detector elements of the infrared rays, since characteristics of the detector elements within the array change, the fixed pattern noise changed over a relatively long time is consequently generated.

In a case where the fixed pattern noise is generated, even though a surface having a uniform temperature is captured by the far-infrared imaging device, a pixel value changes, and a uniform image is not acquired. The far-infrared imaging device has an unevenness correction processing unit (fixed pattern noise correction processing unit) that performs unevenness correction processing (fixed pattern noise correction processing) for correcting unevenness between pixels. For example, correction data (fixed pattern noise data) used in the fixed pattern noise correction processing is acquired in a state in which a light source having a uniform light amount is provided on a front surface of the infrared detector and the infrared rays incident on the infrared detector is blocked from the outside. The fixed pattern noise correction processing unit reduces the influence of the fixed pattern noise by subtracting the fixed pattern noise data acquired in advance from image signals acquired by capturing the subject.

Since the fixed pattern noise changes with a change in environment such as a temperature, it is necessary to repeatedly acquire the fixed pattern noise data in the middle of capturing the subject. The far-infrared imaging device described in JP2007-336288A has a configuration in which the fixed pattern noise data is able to be acquired by having a shutter mechanism on the front surface of the infrared detector and blocking the infrared rays incident on the infrared detector from the outside.

In the far-infrared imaging device, in a case where the shutter mechanism is closed in order to acquire the fixed pattern noise data, the acquisition of the infrared image is interrupted. In a case where the acquisition of the infrared image is interrupted, since the process of detecting the obstacle is stopped, safety is not able to be secured during a process of acquiring the fixed pattern noise data. For this problem, the process of acquiring the fixed pattern noise data is performed by shifting timings between the plurality of far-infrared imaging devices in JP2007-336288A. By doing this, it is possible to avoid a situation in which the acquisition of the infrared image is simultaneously interrupted in, for example, two far-infrared imaging devices, and it is possible to improve safety.

As another example in which the infrared imaging device is used in the vehicle in addition to JP2007-336288A, an obstacle detection system using the far-infrared imaging device and a near-infrared imaging device which is described in JP2007-214806A has been known. In general, a near-infrared image captured by the near-infrared imaging device includes many contour information items compared to a far-infrared image captured by the far-infrared imaging device. Thus, in a case where the same feature amount is extracted from both the infrared images, it is possible to perform image recognition processing with more accuracy by using the near-infrared image. However, the near-infrared image is easily influenced by, for example, ambient light such as headlamps of an oncoming vehicle, and there is a problem that it is difficult to acquire an image capable of being recognized in a case where another light source is present in a capturing range such as a road on which the oncoming vehicle travels at night.

For this problem, in JP2007-214806A, a light amount near the vehicle is detected by a light sensor, a feature amount is extracted from the near-infrared image even though ambient light is not present in a surrounding region in a case where the detected light amount is small, and an obstacle candidate region is determined based on the extracted feature amount. It is assumed that the ambient light is present in the surrounding region in a case where the light amount detected by the light sensor is large, and the feature amount is extracted from the far-infrared image, and the obstacle candidate region is determined based on the extracted feature amount. By doing this, it is possible to determine the obstacle candidate region based on the feature amount extracted from the near-infrared image including many contour information items in a case where the ambient light is not present, and it is possible to determine the obstacle candidate region based on the feature amount extracted from the far-infrared image which is not influenced by the ambient light in a case where the ambient light is present.

SUMMARY OF THE INVENTION

In JP2007-336288A, a plurality of infrared imaging devices is used in order to acquire a parallax picture. In JP2007-336288A, since the plurality of infrared imaging devices is provided, it is possible to continue the capturing in another infrared imaging device for a period during which the capturing in one infrared imaging device is stopped and the fixed pattern noise data is acquired. However, since the far-infrared imaging device is generally expensive, two far-infrared imaging devices or more are provided, and thus, it is disadvantageous in respect to costs.

In JP2007-214806A, the far-infrared imaging device and the near-infrared imaging device are used. In general, the near-infrared imaging device is cheaper than the far-infrared imaging device, and it is possible to reduce the costs compared to a case where two far-infrared imaging devices are used.

However, the acquisition of the fixed pattern noise data in the far-infrared imaging device is not considered in JP2007-214806A. In JP2007-214806A, only the near-infrared image is acquired without acquiring the far-infrared image for a period during which the process of acquiring the fixed pattern noise data in the far-infrared imaging device is performed. In a case where the ambient light is present near the vehicle for a period during which only the near-infrared image is acquired, the obstacle on the near-infrared image is not seen, and thus, there is a problem that a possibility that the obstacle will not be noticed is increased.

The present invention has been made in view of the circumstances, and provides an infrared imaging device and a control method thereof capable of acquiring an image in which influence of ambient light is suppressed for a period during which data used in unevenness correction processing is acquired while reducing the costs.

The present invention provides a vehicle having the infrared imaging device.

In order to achieve the object, the present invention provides an infrared imaging device comprising a first imaging unit that detects far-infrared rays, and captures a first image, a second imaging unit that detects light having a wavelength range shorter than a wavelength range of the far-infrared rays, and captures a second image, an unevenness correction unit that performs unevenness correction processing for correcting unevenness between pixels on the first image, a correction data acquisition unit that performs correction data acquisition processing for acquiring correction data for correcting the unevenness between the pixels on the first image, a light irradiation determination unit that determines that the second imaging unit is irradiated with the light having the wavelength range detected in the second imaging unit, and a control unit that causes the correction data acquisition unit to perform the correction data acquisition processing in a case where the light irradiation determination unit determines whether or not the second imaging unit is not irradiated with the light having the wavelength range shorter than the wavelength range of the far-infrared rays.

In the infrared imaging device of the present invention, the second imaging unit may detect at least one of light having a wavelength range of near-infrared rays or light having a wavelength range of visible light rays.

The infrared imaging device of the present invention may further comprise a light irradiation unit that irradiates a capturing range of the second imaging unit with illumination light having a wavelength included in the wavelength range detected in the second imaging unit.

In the infrared imaging device of the present invention, the control unit may control the light irradiation unit. In this case, the control unit may irradiate the capturing range of the second imaging unit with the illumination light from the light irradiation unit for a period during which the correction data acquisition unit performs the correction data acquisition processing.

In the infrared imaging device of the present invention, the control unit may stop the correction data acquisition processing in a case where the light irradiation determination unit determines that the second imaging unit is irradiated with the light having the wavelength range shorter than the wavelength range of the far-infrared rays before the correction data acquisition processing is completed.

In the infrared imaging device of the present invention, the first imaging unit may include a shutter that blocks light having the wavelength range of the far-infrared rays incident from an outside. In this case, the control unit may control the shutter to block the light having the wavelength range of the far-infrared rays in a case where the correction data acquisition processing is performed by the correction data acquisition unit. In this case, the correction data acquisition processing may include acquiring the correction data in a state in which the shutter blocks the light having the wavelength range of the far-infrared rays.

Alternatively, in the infrared imaging device of the present invention, the first imaging unit may have an optical system that is able to control an image forming position of a subject. In this case, the control unit may control an image forming position using the optical system such that the optical system is in an unfocusing state in a case where the correction data acquisition processing is performed by the correction data acquisition unit. In this case, the correction data acquisition processing may include acquiring the correction data in a state in which the optical system is in the unfocusing state.

In the infrared imaging device of the present invention, it is preferable that at least parts of a capturing range of the first imaging unit and a capturing range of the second imaging unit overlap each other. In the infrared imaging device of the present invention, it is preferable that the infrared imaging device further comprises an image output unit that outputs at least the first image in a case where the correction data acquisition processing is not performed by the correction data acquisition unit, and outputs the second image in a case where the correction data acquisition processing is performed by the correction data acquisition unit.

The infrared imaging device of the present invention may further comprise a condition determination unit that determines whether or not a condition for performing the correction data acquisition processing is satisfied. In this case, the control unit may cause the correction data acquisition unit to perform the correction data acquisition processing in a case where the condition determination unit determines that the condition is satisfied and the light irradiation determination unit determines that the second imaging unit is not irradiated with the light.

The infrared imaging device of the present invention may further comprise a temperature measurement unit that measures a temperature. In this case, the condition determination unit may determine that the condition in which the correction data acquisition processing is performed is satisfied in a case where a difference between a temperature measured by the temperature measurement unit and a temperature at a point of time when previous correction data acquisition processing is performed is equal to or greater than a temperature threshold value. Alternatively, the condition determination unit may determine that the condition is satisfied in a case where a time elapsed after a point of time when the previous correction data acquisition processing is performed is equal to or greater than a time threshold value.

In the infrared imaging device of the present invention, the light irradiation determination unit may determine whether or not the second imaging unit is irradiated with the light having the wavelength range shorter than the wavelength range of the far-infrared rays based on the second image captured by the second imaging unit. Alternatively, the infrared imaging device may further comprise a light sensor that detects irradiation of the light having the wavelength range shorter than the wavelength range of the far-infrared rays detected in the second imaging unit. The light irradiation determination unit may determine whether or not the second imaging unit is irradiated with the light having the wavelength range shorter than the wavelength range of the far-infrared rays based on an output signal of the light sensor.

The present invention provides a vehicle comprising the infrared imaging device of the present invention.

In the vehicle of the present invention, it is preferable that the first imaging unit and the second imaging unit capture a video of a region ahead of the vehicle.

The present invention provides a control method of an infrared imaging device that includes a first imaging unit which detects far-infrared rays and captures a first image and a second imaging unit which detects light having a wavelength range shorter a wavelength range of the far-infrared rays and captures a second image. The method comprises a step of determining whether or not the light having the wavelength range detected in the second imaging unit is applied, and a step of acquiring correction data for correcting unevenness between pixels on the first image in a case where it is determined that the light is not applied.

In a far-infrared imaging device, a control method thereof, and a vehicle of the present invention, a first imaging unit which captures far-infrared rays and a second imaging unit which captures at least one of near-infrared rays and visible light, which has, for example, a wavelength shorter than a wavelength of the far-infrared rays are used. In the first imaging unit, processing for acquiring data used in unevenness correction processing is performed in a case where the second imaging unit is not irradiated with light. By doing this, it is possible to acquire an image in which influence of ambient light is suppressed for a period during which data used in the unevenness correction processing is acquired in the first imaging unit. It is possible to reduce the costs compared to a case where a plurality of far-infrared imaging devices is used.

DESCRIPTION OF THE PREFERRED EMBODIMENTS

Figure 1:
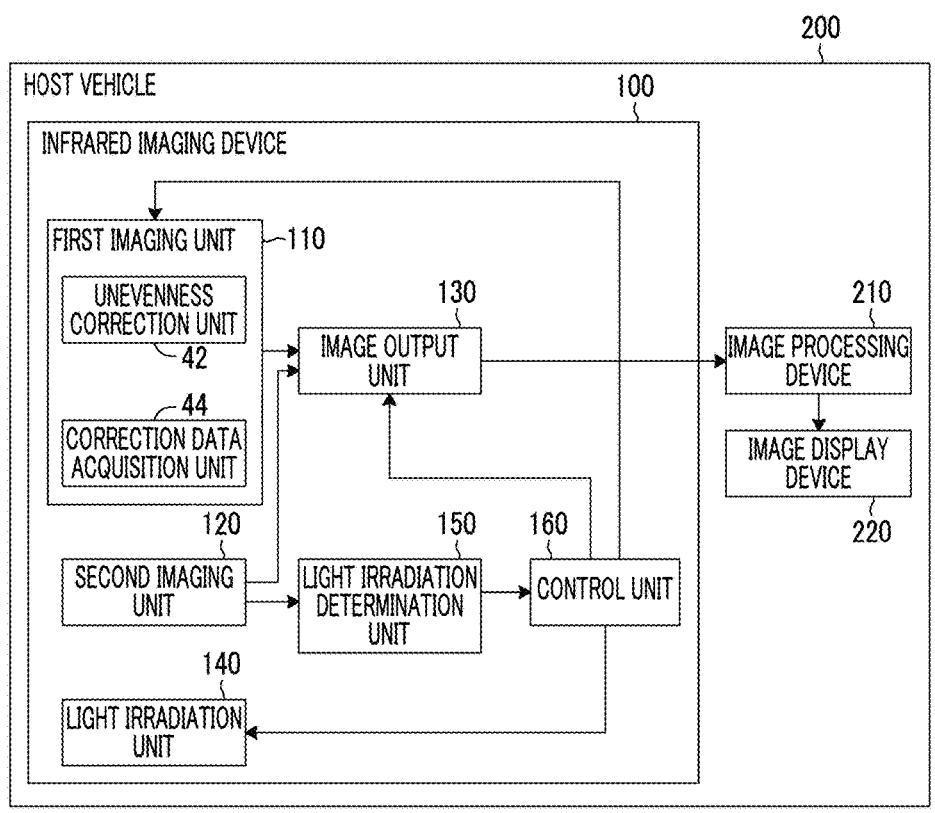
FIG. 1 is a block diagram showing a vehicle including an infrared imaging device according to a first embodiment of the present invention.

Hereinafter, an embodiment of the present invention will be described in detail with reference to the drawings. FIG. 1 is a block diagram showing a vehicle including an infrared imaging device according to a first embodiment of the present invention. A vehicle 200 has an infrared imaging device 100, an image processing device 210, and an image display device 220. The infrared imaging device 100 has a first imaging unit 110, a second imaging unit 120, an image output unit 130, a light irradiation unit 140, a light irradiation determination unit 150, and a control unit 160.

The first imaging unit 110 detects far-infrared rays, and captures a far-infrared image (first image). In general, in the first imaging unit 110, an offset and/or a gain of a detection signal varies for each detector element due to variation in sensitivity of each detector element (pixel) in an infrared detector that detects far-infrared rays. In the present embodiment, a process of correcting the offset and/or gain of the detection signal that varies in each detector element and correcting variation (unevenness) between pixels on the far-infrared image is referred to as unevenness correction processing. A process of acquiring data (correction data) used for correcting the unevenness in the unevenness correction processing is referred to as correction data acquisition processing. The first imaging unit 110 includes an unevenness correction unit 42 which performs the unevenness correction processing and a correction data acquisition unit 44 which performs the correction data acquisition processing.

Figure 2:
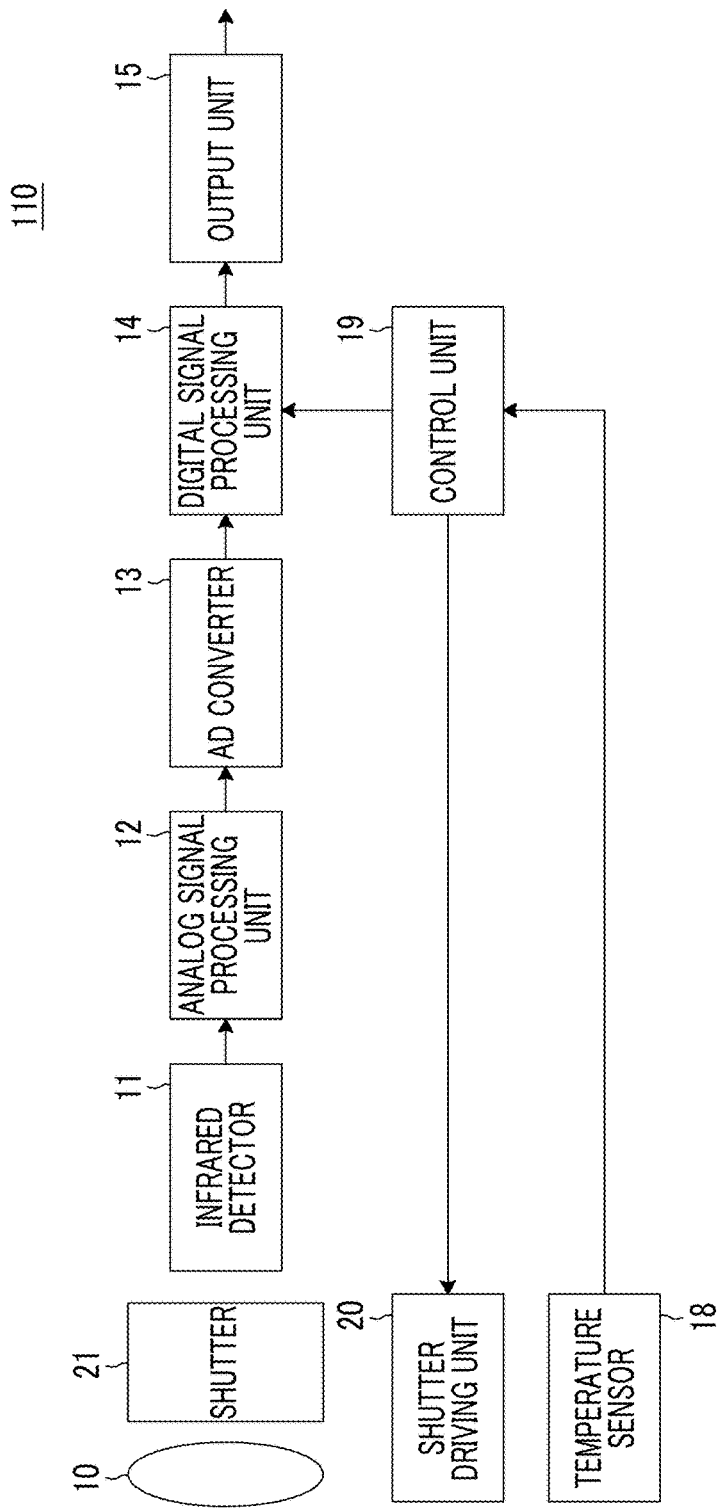
FIG. 2 is a block diagram showing a first imaging unit.

FIG. 2 is a block diagram showing the first imaging unit. The first imaging unit 110 has an optical system 10, an infrared detector 11, an analog signal processing unit 12, an analog-to-digital converter (AD converter) 13, a digital signal processing unit 14, an output unit 15, a temperature sensor 18, a control unit 19, a shutter driving unit 20, and a shutter 21.

The optical system 10 is an image forming optical system including one or more lenses. It is preferable that the optical system 10 can control a position of an image forming surface (image forming position). The infrared detector 11 is an infrared imaging element (infrared sensor), and captures an optical image formed by the optical system 10, and converts the captured optical image into electrical signals. The infrared detector 11 includes a plurality of detector elements which detects incident infrared light (infrared rays). For example, the plurality of detector elements is arranged in two dimensions in the infrared detector 11. The infrared rays are incident on an infrared detection surface of the infrared detector 11 through the optical system 10. An infrared image is formed based on the detection signals of the detector elements of the infrared detector 11.

For example, the infrared detector 11 detects infrared rays having a wavelength range from 0.83 μm to 1000 μm. Particularly, it is preferable that the infrared detector 11 detects far-infrared rays having a wavelength range from 6 μm to 1000 μm. A microbolometer or a thermal infrared sensor such as a silicon on insulator (SOI) diode type is used as the infrared detector 11.

The analog signal processing unit 12 performs analog electric processing on infrared detection signals output by the infrared detector 11. The analog signal processing unit 12 typically includes an amplifier that amplifies the infrared detection signals. The AD converter 13 performs sampling on the infrared detection signals, and converts the sampled infrared detection signals into digital data (digital signal values). The digital signal processing unit 14 performs signal processing on the infrared detection signals converted into the digital data by the AD converter 13. The signal processing in the digital signal processing unit 14 includes unevenness correction processing and correction data acquisition processing.

The output unit 15 outputs the infrared detection signals (far-infrared image data) acquired through the signal processing in the digital signal processing unit 14, as output signals of the first imaging unit 110. For example, the output unit 15 includes a digital-to-analog convertor (DA converter) that converts the digital signals into analog signals, and outputs the infrared detection signals as the analog signals. The output unit 15 may output the infrared detection signals as the digital signals.

The control unit 19 performs the overall control of the first imaging unit 110. For example, a programmable logic device (PLD) such as a field-programmable gate array (FPGA) may be used as the control unit 19. The control unit 19 switches an operation mode of the first imaging unit 110 between a normal capturing mode and a mode (correction data acquisition mode) in which the correction data acquisition processing is performed. The control unit 19 controls the signal processing in the digital signal processing unit 14 depending on the operation mode according to a control signal. Specifically, the digital signal processing unit 14 performs the unevenness correction processing in the normal capturing mode, and performs the correction data acquisition processing in the correction data acquisition mode.

The temperature sensor (temperature measurement unit) 18 measures a temperature of the infrared detector 11 and a temperature of a surrounding region thereof. The control unit 19 functions as a condition determination unit that determines whether or not a condition for performing the correction data acquisition processing is satisfied. For example, the control unit 19 determines whether or not the condition for performing the correction data acquisition processing is satisfied based on a change of the temperature measured by the temperature sensor 18. Specifically, in a case where a difference between the temperature measured by the temperature sensor 18 and a temperature at a point of time when the previous correction data acquisition processing is performed is equal to or greater than a temperature threshold value, the control unit may determine that the condition for performing the correction data acquisition processing is satisfied.

Alternatively, the control unit 19 may determine whether or not the condition for the correction data acquisition processing is satisfied based on a time. For example, in a case where a time elapsed after a point of time when the previous correction data acquisition processing is performed is equal to or greater than a time threshold value, the control unit 19 may determine that the condition for performing the correction data acquisition processing is satisfied. The time threshold value does not need to be a fixed value, and the control unit 19 does not need to determine that the condition for performing the correction data acquisition processing is satisfied whenever a predetermined fixed time elapses all the time.

In a case where it is determined that the condition for performing the correction data acquisition processing is satisfied, the control unit 19 notifies the control unit 160 (FIG. 1) of the infrared imaging device 100 of information indicating that the condition is satisfied. The control unit 160 determines whether or not to perform the correction data acquisition processing. The determination of whether or not to perform the correction data acquisition processing in the control unit 160 will be described below. In a case where it is determined to perform the correction data acquisition processing, the control unit 160 notifies such a determination result to the control unit 19. The control unit 19 switches the operation mode based on the notification from the control unit 160.

The shutter 21 is provided between the optical system 10 and the infrared detector 11. The shutter driving unit 20 drives the shutter 21 according to a command of the control unit 19. The shutter driving unit 20 drives the shutter 21 between an opened state in which the infrared rays passed through the optical system 10 are incident on the infrared detector 11 and a closed state in which the infrared rays passed through the optical system 10 are blocked and are not incident on the infrared detector 11. The control unit 19 instructs the shutter driving unit 20 to cause the shutter 21 to enter the opened state in the normal capturing mode, and instructs the shutter driving unit 20 to cause the shutter 21 to enter the closed state in the correction data acquisition mode. The shutter 21 is in the closed state, and thus, the light having the wavelength range of the far-infrared rays is blocked.

Figure 3:
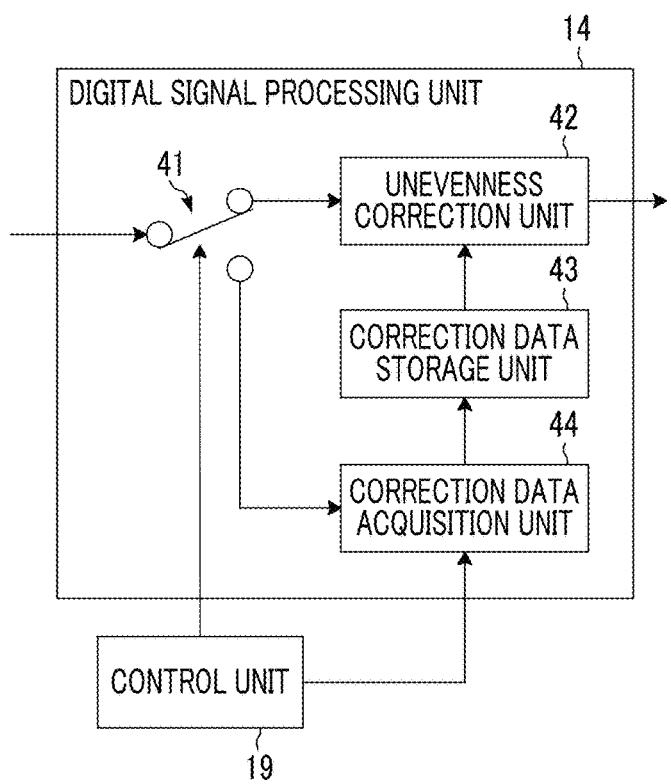
FIG. 3 is a block diagram showing a configuration of a digital signal processing unit.

FIG. 3 is a block diagram showing a configuration of the digital signal processing unit 14. The digital signal processing unit 14 has a switch 41, an unevenness correction unit 42, a correction data storage unit 43, and a correction data acquisition unit 44. For example, the digital signal processing unit 14 is a large scale integration (LSI) such as a digital signal processor (DSP). The DSP typically includes a processor, a read only memory (ROM) that stores a command for the processor, and a random access memory (RAM) that stores data, and these processor, ROM, and RAM are connected through a bus. The processor operates according to the command stored in the ROM, and thus, the functions of the unevenness correction unit 42 and the correction data acquisition unit 44 are realized. The DSP may have an interface that is connected to an external storage device.

Digital data (hereinafter, the infrared detection signals converted to the digital data may be referred to as the infrared detection signals without being particularly distinguished) of the infrared detection signals output by the AD converter 13 (see FIG. 2) is input to the switch 41. The switch 41 selectively outputs the infrared detection signals to the unevenness correction unit 42 and the correction data acquisition unit 44. For example, the switch 41 is switched based on a control signal output by the control unit 19. The infrared detection signals are output from the switch 41 to the unevenness correction unit 42 by the control unit 19 in the normal capturing mode. The infrared detection signals are output from the switch 41 to the correction data acquisition unit 44 by the control unit 19 in the correction data acquisition mode.

The unevenness correction unit 42 performs the unevenness correction processing for correcting unevenness between pixels on the far-infrared image. The correction data acquisition unit 44 performs the correction data acquisition processing for acquiring correction data for correcting unevenness. The correction data acquisition processing performed by the correction data acquisition unit 44 includes acquiring the correction data in a state in which the light having the wavelength range of the far-infrared rays is blocked by the shutter 21.

The infrared detection signals detected by the infrared detector 11 in a state in which the shutter 21 is driven in the opened state are input to the unevenness correction unit 42 through the switch 41. The unevenness correction unit 42 corrects the unevenness between the pixels included in the infrared detection signals by referring to the correction data storage unit 43. The correction data storage unit 43 stores the correction data for performing the unevenness correction processing. For example, the correction data storage unit 43 may be provided within the RAM of the digital signal processing unit 14, or may be such as a rewritable non-volatile memory such as an electrically erasable and programmable read only memory (EEPROM).

Here, in the present embodiment, fixed pattern noise (hereinafter, referred to as FPN) correction processing for correcting FPN in particular is considered as the unevenness correction processing performed by the unevenness correction unit 42. The FPN refers to a noise component which is specific to each detector element (pixel) of the infrared detector 11 and is included in the detection signal of each detector element (see FIG. 1). The correction data storage unit 43 stores, as the correction data, the FPN data used in the FPN correction processing. The FPN data is data representing the FPNs of the detector elements, and is a set of FPNs of the detector elements. In an initial state, the correction data storage unit 43 may store, as the FPN data, the infrared detection signals detected by the infrared detector 11 in a state in which the light source of a homogeneous light amount is provided in front of the infrared detector 11 and the infrared rays incident on the infrared detector 11 from the outside are blocked.

The unevenness correction unit 42 removes the FPNs from the infrared detection signals by subtracting the FPN data from the infrared detection signals. More specifically, the unevenness correction unit 42 removes the noise component specific to the detector element by subtracting the FPN data of the detector elements from the infrared detection signals output by the detector elements included in the infrared detector 11. By doing this, the signal components depending on the amount of infrared rays incident on the detector elements are acquired.

The infrared detection signals detected by the infrared detector 11 in a state in which the shutter 21 is driven in the closed state are input to the correction data acquisition unit 44 through the switch 41. The correction data acquisition unit 44 generates the FPN data based on the input infrared detection signals. The correction data acquisition unit 44 updates the FPN data stored in the correction data storage unit 43 by storing the generated FPN data in the correction data storage unit 43.

Here, a case where the FPN data is updated means that the FPN data stored in the correction data storage unit 43 is rewritten with new data. The updating of the FPN data includes not only the updating of all the detector elements included in the infrared detector 11 at one time but also the updating of some of all the detector elements. For example, in a case where the infrared detector 11 includes 100 detector elements, the FPN data of 100 detector elements may be updated, or the FPN data of 40 to 70 detector elements out of 100 detector elements may be updated whenever the updating is performed.

Referring back to FIG. 1, the second imaging unit 120 detects the light having a wavelength range shorter than that of the far-infrared rays, and captures a second image. For example, a lower limit of a wavelength range of light rays captured by the second imaging unit 120 is a wavelength range of about 380 nm which is a boundary between a wavelength range of ultraviolet rays and a wavelength range of visible light rays. For example, the second imaging unit 120 detects at least one of the light having the wavelength range of near-infrared rays or the light having the wavelength range of the visible light rays. Hereinafter, the operation of the second imaging unit 120 that detects the light having the wavelength range of the near-infrared rays and generate the near-infrared image will be mainly described.

The light irradiation unit 140 includes a lamp or a floodlight, and irradiates a capturing range of the second imaging unit 120 with illumination light. The illumination light is applied from the light irradiation unit 140, and thus, the second imaging unit 120 can perform capturing even at night at which a surrounding region is dark. The wavelength of the illumination light applied by the light irradiation unit 140 is included in the wavelength range of the light captured by the second imaging unit 120. For example, in a case where the second imaging unit 120 captures the near-infrared rays, the light irradiation unit 140 irradiates the capturing range with near-infrared light as the illumination light. In a case where the second imaging unit 120 captures visible light rays, the light irradiation unit 140 irradiates the capturing range with the visible light as the illumination light. In general, since the near-infrared rays reach further than the visible light, it is preferable that the second imaging unit 120 captures the light having the wavelength range of the near-infrared rays. Here, for example, the wavelength range of the near-infrared rays is equal to or greater than 0.7 μm and is less than 2.5 μm, and the wavelength range of the far-infrared rays is equal to or greater than 4 μm and is less than 1000 μm. For example, the wavelength range of the visible light rays is equal to or greater than 380 nm and is equal to or less than 800 nm.

A basic configuration of the second imaging unit 120 may be the same as the configuration of the first imaging unit 110 shown in FIG. 2. Here, in the second imaging unit 120, it is not necessary to perform the correction data acquisition processing in the digital signal processing unit 14, and thus, the control unit 19 does not need to switch the operation mode of the second imaging unit 120 between the normal capturing mode and the correction data acquisition mode.

For example, the first imaging unit 110 and the second imaging unit 120 are the imaging units used for monitoring a region ahead of the vehicle, and capture a video of the region ahead of the vehicle. Here, the region ahead of the vehicle refers to a forward direction of the vehicle 200. For example, the first imaging unit 110 and the second imaging unit 120 capture the capturing ranges at substantially the same angle with the same imaging magnification. The capturing range of the first imaging unit 110 and the capturing range of the second imaging unit 120 do not need to completely match each other, and at least a part thereof may overlap with each other.

The image output unit 130 outputs at least one of the far-infrared image captured by the first imaging unit 110 or the near-infrared image captured by the second imaging unit 120, as an output image of the infrared imaging device 100. For example, the image output unit 130 may selectively output any one of the far-infrared image and the near-infrared image, or may output both the far-infrared image and the near-infrared image. In a case where the image output unit outputs both the far-infrared image and the near-infrared image, the image output unit 130 may output an image acquired by superimposing both the images on each other.

The image processing device 210 performs image processing on the image output by the infrared imaging device 100, that is, the image output by the image output unit 130. For example, the image processing device 210 includes LSI such as DSP. For example, the image processing performed by the image processing device 210 includes processing for detecting a person present on a runway ahead of the vehicle 200 or a person present near the runway. The image processing may include processing for detecting an obstacle such as a falling object present on the runway.

The image processing device 210 displays the output image of the infrared imaging device 100 and the result of the image processing on the image display device 220. The image display device 220 is, for example, a liquid crystal display. The image processing device 210 may also warn the user by means of a notification unit such as a speaker or a warning light (not shown) in addition to performing image display. The image processing device 210 may be omitted, and the output image of the infrared imaging device 100 may be displayed on the image display device 220.

The light irradiation determination unit 150 determines whether or not the second imaging unit 120 is irradiated with the light having the wavelength range of the light captured by the second imaging unit 120. For example, in a case where the second imaging unit 120 captures the near-infrared rays, the light irradiation determination unit 150 determines whether or not the second imaging unit 120 is irradiated with the near-infrared light (near-infrared rays). For example, the light irradiation determination unit 150 may determine whether or not the second imaging unit 120 is irradiated with the near-infrared light based on the near-infrared image captured by the second imaging unit 120. For example, the light irradiation determination unit 150 includes the DSP that performs the image processing on the near-infrared image.

Instead of determining the light irradiation based on the near-infrared image captured by the second imaging unit 120, a light sensor (not shown in FIG. 1) that detects the irradiation of the light of the wavelength range captured by the second imaging unit 120 is separately provided, and the light irradiation determination unit 150 may determine whether or not the light irradiation is performed based on an output signal of the light sensor. Specifically, in a case where the output signal of the light sensor is equal to or greater than a threshold value, the light irradiation determination unit may determine that the second imaging unit 120 is irradiated with the near-infrared light. In a case where the light irradiation determination unit determines that the second imaging unit is irradiated with the near-infrared light, the light irradiation determination unit 150 transmits a signal indicating such a determination result to the control unit 160.

The control unit 160 determines whether or not to cause the first imaging unit 110 to perform the correction data acquisition processing based on the signal received from the light irradiation determination unit 150. In a case where a signal indicating that the second imaging unit 120 is irradiated with the near-infrared light is not received from the light irradiation determination unit 150 or a case where a signal indicating that the second imaging unit 120 is not irradiated with the near-infrared light is received, the control unit 160 determines to cause the first imaging unit 110 to perform the correction data acquisition processing. For example, the control unit 160 includes PLD such as FPGA.

For example, in a case where notification indicating that the condition for performing the correction data acquisition processing is satisfied is received from the control unit 19 of the first imaging unit 110, the control unit 160 determines whether or not to cause the first imaging unit to perform the correction data acquisition processing. In a case where the condition for performing the correction data acquisition processing is satisfied and the light irradiation determination unit 150 determines that the second imaging unit 120 is not irradiated with the near-infrared light, the control unit 160 determines to cause the first imaging unit 110 to perform the correction data acquisition processing. In a case where the light irradiation determination unit 150 determines that the second imaging unit 120 is irradiated with the near-infrared light even though the condition for performing the correction data acquisition processing is satisfied, the control unit determines to cause the first imaging unit 110 not to perform the correction data acquisition processing.

In a case where the control unit determines to cause the first imaging unit to perform the correction data acquisition processing, the control unit 160 notifies such a determination result to the control unit 19 (see FIG. 2). The control unit 19 drives the shutter driving unit 20 to cause the shutter 21 so as to enter the closed state, switches the selection of the switch 41 (see FIG. 3), and causes the correction data acquisition unit 44 to start the correction data acquisition processing. Instead of determining whether or not the condition for performing the correction data acquisition processing is satisfied in the control unit 19 of the first imaging unit 110, the control unit 160 may determine whether or not the condition is satisfied. In other words, the control unit 160 itself may function as a condition determination unit.

The control unit 160 may perform control of the image output by the image output unit 130. In a case where the correction data acquisition unit 44 does not perform the correction data acquisition processing in the first imaging unit 110, the control unit 160 causes the image output unit 130 to output the far-infrared image. In a case where the correction data acquisition unit 44 performs the correction data acquisition processing, the control unit 160 causes the image output unit 130 to output the near-infrared image. In a case where the correction data acquisition processing is not performed, the image output unit 130 may output at least the far-infrared image, or may output the near-infrared image in addition to the far-infrared image.

The control unit 160 may also perform the control of the irradiation of the illumination light from the light irradiation unit 140. For example, the control unit 160 causes the illumination light (near-infrared light) to be irradiated from the light irradiation unit 140 for a period during which the correction data acquisition unit 44 performs the correction data acquisition processing in the first imaging unit 110. In a case where the control unit 160 does not cause the correction data acquisition unit 44 to perform the correction data acquisition processing, the control unit 160 does not cause the near-infrared light to be irradiated from the light irradiation unit 140. In a case where the near-infrared light is irradiated only for a period during which the correction data acquisition processing is performed, the irradiation of the near-infrared light leads to an effect of notifying that the capturing in the first imaging unit 110 of the host vehicle is stopped and the correction data acquisition processing is performed to an oncoming car that travels on an opposing lane. The irradiation of the near-infrared light from the light irradiation unit 140 is not required. For example, in a case where the near-infrared image is able to be captured in the second imaging unit 120 even though the irradiation of the near-infrared light is not performed during daytime, it is not necessary to irradiate the imaging unit with the near-infrared light from the light irradiation unit 140.

Figure 4:
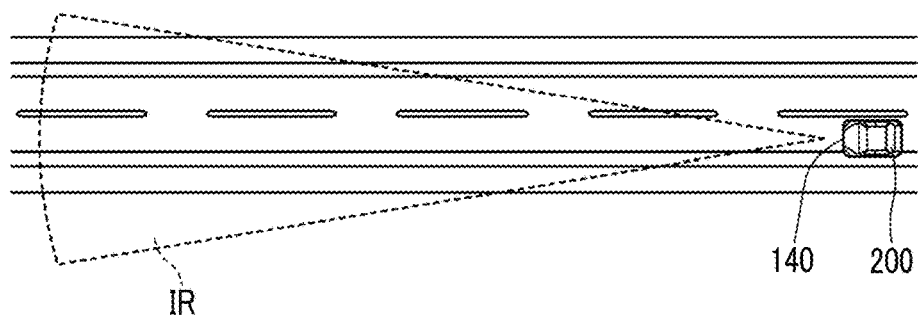
FIG. 4 is a diagram showing an irradiation range of near-infrared light applied by a light irradiation unit.

FIG. 4 shows that irradiation range of the near-infrared light applied by the light irradiation unit 140. For example, the light irradiation unit 140 is disposed on a front bumper or a grille of the vehicle 200, and emits illumination light (near-infrared light) IR that illuminates the region ahead of the vehicle 200. For example, it is preferable that the irradiation range of the near-infrared light IR is equal to the irradiation range of high beams of headlamps of the vehicle 200. In a case where the person or the obstacle is present in the irradiation range of the near-infrared light IR, the reflection near-infrared light generated by the person or the obstacle is detected by the second imaging unit 120, and thus, it is possible to recognize the person or the obstacle on the near-infrared image.

Figure 5:
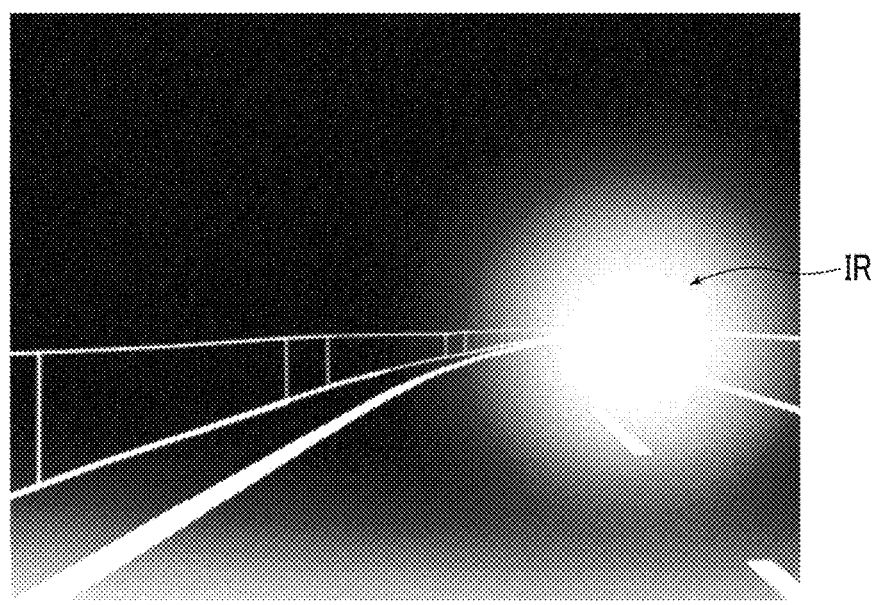
FIG. 5 is a diagram showing a second image in a case where light irradiation is performed for a second imaging unit.

FIG. 5 shows the near-infrared image in a case where the light irradiation is performed for the second imaging unit 120. It is considered that the vehicle 200 is irradiated with the near-infrared light IR from the oncoming vehicle that travels on the opposing lane. In this case, since the intensity of the near-infrared light IR applied from the light source is high, a signal value (brightness value) of a portion irradiated with the near-infrared light IR becomes extremely higher than a signal value of a surrounding region on the near-infrared image captured by the second imaging unit 120. An area of a region in which a signal value occupying the entire near-infrared image is high becomes relatively wide.

In the present embodiment, the near-infrared image captured by the second imaging unit 120 is used in the determination of whether or not the second imaging unit 120 of the host vehicle 200 is irradiated with the near-infrared light. The determination of whether or not the host vehicle 200 is irradiated with the near-infrared light from the opposing lane may be performed by calculating an area of a region in which the signal value is equal to or greater than a threshold value related to luminance on the near-infrared image shown in FIG. 5 and investigating whether or not the area is equal to or greater than a threshold value related to the area.

As in the example shown in FIG. 5, in a case where the vehicle is irradiated with the near-infrared light IR from the opposing lane and the light source of the near-infrared light IR is reflected on the near-infrared image, halation may occur on the near-infrared image. In this case, even in a case where the person or the obstacle is present on a traveling lane or near the traveling lane, it is difficult to visually perceive the person or the obstacle on the near-infrared image. In a case where the oncoming vehicle is irradiated with the near-infrared light from the light irradiation unit 140 of the host vehicle 200 in a situation in which the vehicle is irradiated with the near-infrared light IR from a opposing lane, a disappearance phenomenon occurs due to both the near-infrared light, and thus, the person present in the region ahead of the host vehicle 200 may not be invisible. Meanwhile, even though the vehicle is irradiated with the near-infrared light IR from the opposing lane, the near-infrared light IR has little influence on the far-infrared image captured by the first imaging unit 110.

In the first imaging unit 110, a situation in which it is necessary to perform the correction data acquisition processing (a timing when the condition for performing the correction data acquisition processing is satisfied) occurs irrespective of a traveling situation of the vehicle 200. In a case where it is necessary to perform the correction data acquisition processing and the correction data acquisition processing is immediately performed in the first imaging unit 110, even in a situation in which the second imaging unit 120 is irradiated with the near-infrared light, the image output by the infrared imaging device 100 is switched to the near-infrared image captured by the second imaging unit 120. In this case, there is a possibility that the person or the obstacle will not be noticed on the near-infrared image.

Thus, in the present embodiment, the control unit controls whether or not to perform the correction data acquisition processing in the first imaging unit 110 based on whether or not the light irradiation is performed for the second imaging unit 120. In a case where the light irradiation determination unit 150 determines that the second imaging unit 120 is irradiated with the near-infrared light even though the condition for performing the correction data acquisition processing is satisfied in the first imaging unit 110, the control unit 160 suppresses the performing of the correction data acquisition processing. By suppressing the performing of the correction data acquisition processing, it is possible to monitor the region ahead of the vehicle by using the far-infrared image, and it is possible to reduce a risk that the person or the obstacle present on the runway and near the runway will not be noticed.

Figure 6:
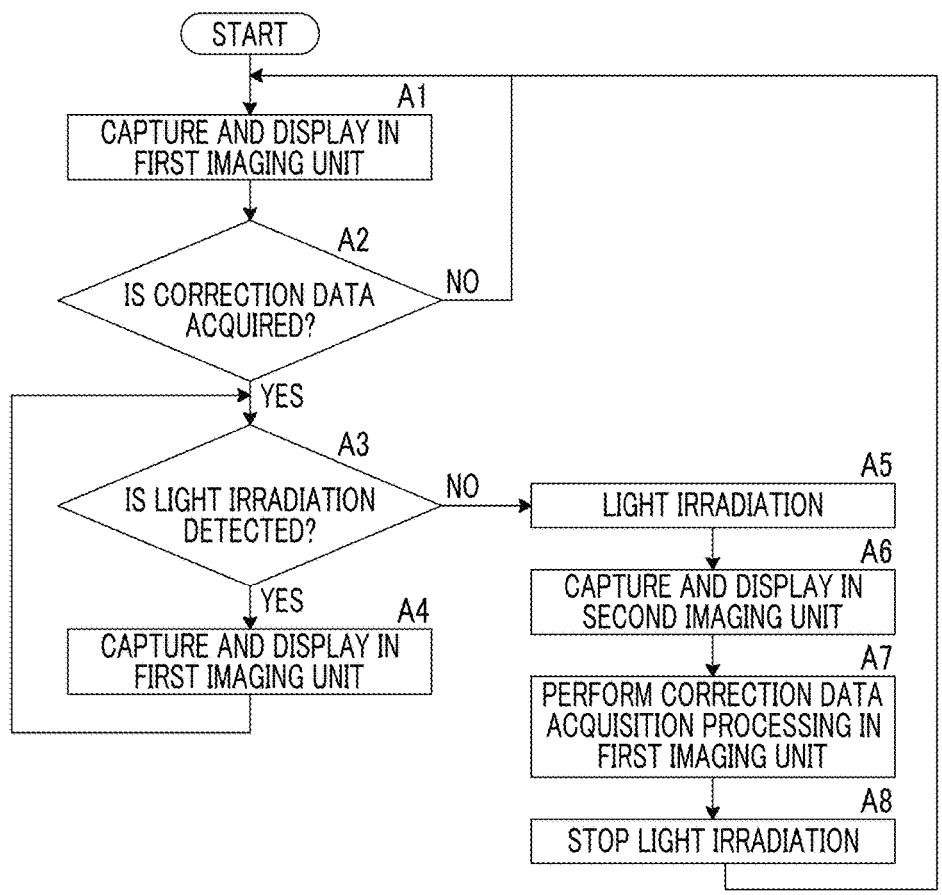
FIG. 6 is a flowchart showing an operation procedure in the infrared imaging device according to the first embodiment of the present invention.

FIG. 6 is a flowchart showing an operation procedure of the infrared imaging device 100. The first imaging unit 110 captures the far-infrared image (step A1). The far-infrared image captured by the first imaging unit 110 is output to the image processing device 210 from the image output unit 130, and is displayed on the image display device 220 provided in the vehicle 200 by the image processing device 210. A user such as a driver observes the far-infrared image displayed on the image display device 220, and thus, it is possible to check whether or not the person or the obstacle on the runway is not present. The second imaging unit 120 captures the near-infrared image for a period during which the far-infrared image is output from the image output unit 130. For example, the near-infrared image is used in the determination in the light irradiation determination unit 150.

The control unit 19 (see FIG. 2) of the first imaging unit 110 determines whether or not the condition for performing the correction data acquisition processing is satisfied (step A2). For example, in a case where a difference between the temperature measured by the temperature sensor 18 and the temperature at a point of time when the previous correction data acquisition processing is performed is equal to or greater than a temperature threshold value, the control unit 19 determines that the condition for performing the correction data acquisition processing is satisfied. Instead, in a case where a time elapsed after a point of time when the previous correction data acquisition processing is performed is equal to or greater than a time threshold value, the control unit 19 may determine that the condition for performing the correction data acquisition processing is satisfied. In a case where the control unit determines that the condition for performing the correction data acquisition processing is not satisfied in step A2, the process returns to step A1, and the capturing of the far-infrared image is continued.

In a case where the control unit determines that the condition for performing the correction data acquisition processing is satisfied in step A2, the control unit 160 determines whether or not the second imaging unit 120 is irradiated with the near-infrared light based on the determination result in the light irradiation determination unit 150 (step A3). In a case where the control unit determines that the second imaging unit 120 is irradiated with the near-infrared light in step A3, the first imaging unit 110 continuously captures the far-infrared image (step A4), and the captured far-infrared image is displayed on the image display device 220. The far-infrared image in the first imaging unit 110 is continuously captured until the control unit determines that the second imaging unit 120 is not irradiated with the near-infrared light in step A3.

In a case where the control unit determines that the second imaging unit is not irradiated with the near-infrared light in step A3, the control unit 160 irradiates the capturing range of the second imaging unit 120 with the illumination light (near-infrared light) from the light irradiation unit 140 (step A5). The control unit 160 switches the image output by the image output unit 130 from the far-infrared image captured by the first imaging unit 110 to the near-infrared image captured by the second imaging unit 120 (step A6). The near-infrared image output from the image output unit 130 is output to the image processing device 210, and is displayed on the image display device 220 provided in the vehicle 200 by the image processing device 210.

Thereafter, the control unit 160 instructs the first imaging unit 110 to perform the correction data acquisition processing, and the first imaging unit 110 performs the correction data acquisition processing (step A7). For example, in step A7, the first imaging unit 110 sets the shutter 21 to be in the closed state by the shutter driving unit 20 (see FIG. 2), switches the selection of the switch 41 (see FIG. 3) from the unevenness correction unit 42 to the correction data acquisition unit 44, and causes the correction data acquisition unit 44 to start the correction data acquisition processing.

In a case where the correction data acquisition processing is ended in the first imaging unit 110, the control unit 160 returns the image output by the image output unit 130 from the near-infrared image to the far-infrared image. The control unit 160 causes the light irradiation unit 140 to stop the irradiation of the near-infrared light (step A8). It is preferable that a timing when the irradiation of the near-infrared light is stopped is a timing after the image output by the image output unit 130 is switched from the near-infrared image to the far-infrared image. After the irradiation of the near-infrared light from the light irradiation unit 140 is stopped, the near-infrared image captured by the second imaging unit 120 is used in the determination of the light irradiation from the light irradiation determination unit 150 to the second imaging unit 120. After the irradiation of the near-infrared light from the light irradiation unit 140 is stopped, the process returns to step A1, and the capturing of the far-infrared image is continued.

In the present embodiment, the infrared imaging device 100 has the first imaging unit 110 that captures the far-infrared image and the second imaging unit 120 that captures the near-infrared image. The first imaging unit 110 needs to perform the unevenness correction processing for correcting the unevenness between the pixels, and it is preferable that the first imaging unit 110 periodically performs the correction data acquisition processing for acquiring the correction data used in the unevenness correction processing. In general, the capturing of the far-infrared image is interrupted and the far-infrared image is not able to be used for a period during which the correction data acquisition processing is performed in the first imaging unit 110. In the present embodiment, the infrared imaging device 100 outputs the near-infrared image captured by the second imaging unit 120 for a period during which the correction data acquisition processing is performed and the far-infrared image is not able to be used. The user can monitor the region ahead of the vehicle by using the near-infrared image captured by the second imaging unit 120.

However, since the near-infrared image is greatly influenced by ambient light, in a case where the region ahead of the vehicle is monitored by using the near-infrared image captured by the second imaging unit 120 in a situation in which the second imaging unit 120 is irradiated with the near-infrared light, there is a concern that the person or the obstacle is not noticed. Thus, in the present embodiment, the control unit determines whether or not the light irradiation is performed for the second imaging unit 120 by the light irradiation determination unit 150, the correction data acquisition processing is performed in the first imaging unit 110 in a case where the control unit determines that the light irradiation is not performed. By doing this, it is possible to acquire the second image in which the influence of the ambient light is suppressed in the second imaging unit 120 for a period during which the correction data is acquired. In the present embodiment, it is possible to prevent the image output by the infrared imaging device 100 from being switched to the near-infrared image in a situation in which the person or the obstacle is not seen on the near-infrared image, and it is possible to improve safety in monitoring the region ahead of the vehicle.

In the present embodiment, the region ahead of the vehicle is monitored by using the near-infrared image captured by the second imaging unit 120 for a period during which the correction data acquisition processing is performed in the first imaging unit 110 and the monitoring is not able to be performed by using the far-infrared image. In a case where the same imaging unit as the first imaging unit is used as the second imaging unit 120, since the imaging unit that captures the far-infrared rays is generally expensive, the costs of the infrared imaging device 100 are increased. Since the imaging unit that captures the near-infrared rays and/or visible light is cheaper than the imaging unit that captures the far-infrared rays, it is possible to suppress the costs of the infrared imaging device 100 compared to a case where a plurality of imaging units that captures the far-infrared rays is used.

In the present embodiment, the control unit 160 applies the near-infrared light (illumination light) from the light irradiation unit 140 only for a period during which the correction data acquisition processing is performed in the first imaging unit 110. In a case where the light irradiation unit 140 constantly applies the near-infrared light, the vehicle that travels on the opposing lane is irradiated with the near-infrared light applied from the light irradiation unit 140. In a case where the capturing of the near-infrared rays is performed in the vehicle that travels on the opposing lane, the near-infrared light applied by the light irradiation unit 140 of the host vehicle 200 becomes the ambient light on the near-infrared image captured by the vehicle that travels on the opposing lane. In the present embodiment, the period during which the light irradiation unit 140 applies the near-infrared light is restricted to the period during which the correction data acquisition processing is performed, and thus, it is possible to suppress adverse influence of the near-infrared light applied from the light irradiation unit 140 of the host vehicle 200 on the vehicle that travels on the opposing lane.

Next, a second embodiment of the present invention will be described. A configuration of an infrared imaging device according to the second embodiment of the present invention may be the same as the configuration of the infrared imaging device 100 according to the first embodiment shown in FIG. 1. In the present embodiment, the light irradiation determination unit 150 determines whether or not the second imaging unit 120 is also irradiated with the light for a period during which the correction data acquisition processing is performed in the first imaging unit 110. In a case where the light irradiation determination unit 150 determines that the second imaging unit 120 is irradiated with the light before the correction data acquisition processing is completed, the control unit 160 stops the correction data acquisition processing. Other points may be the same as those of the first embodiment.

Figure 7:
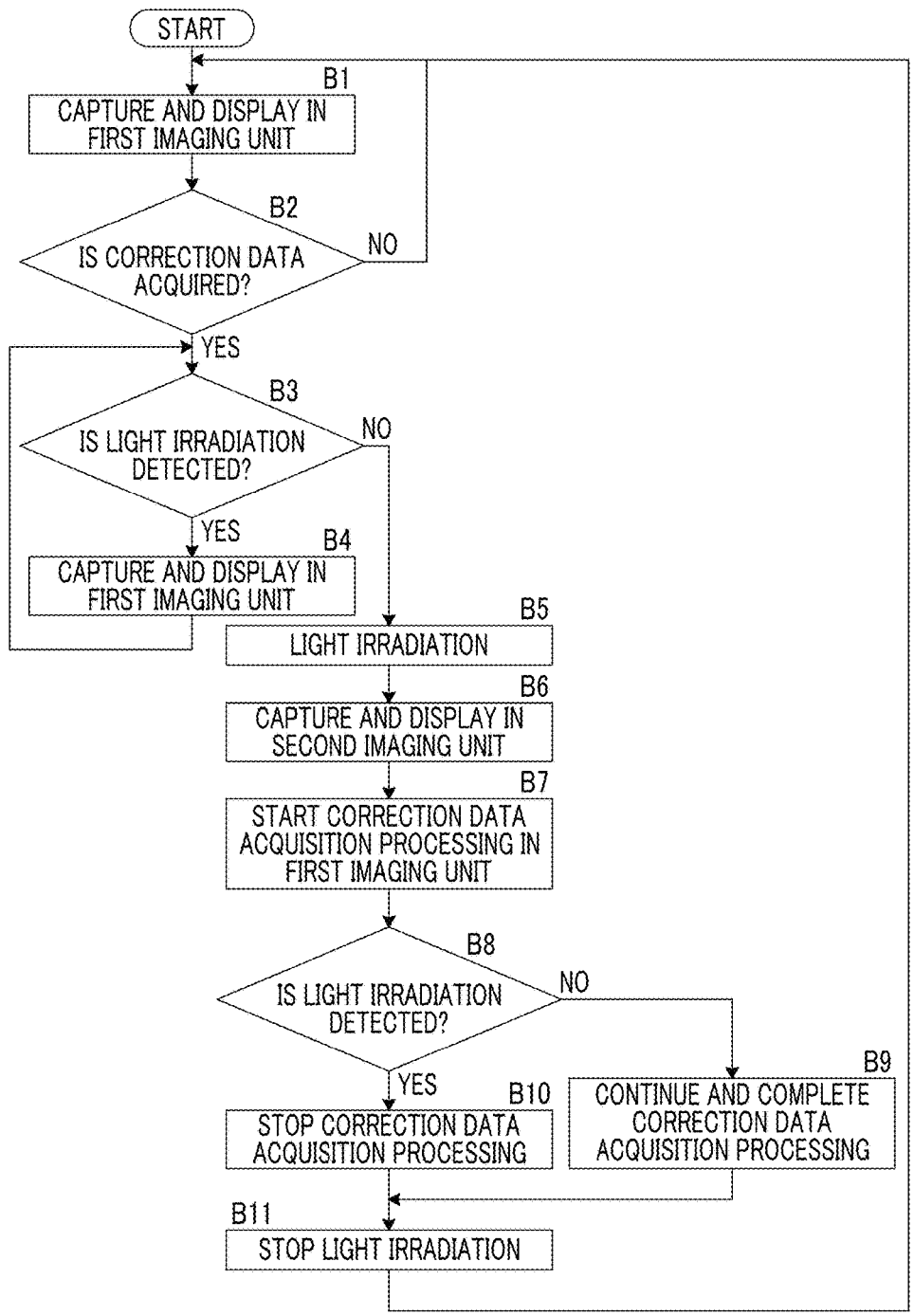
FIG. 7 is a flowchart showing an operation procedure in an infrared imaging device according to a second embodiment of the present invention.

FIG. 7 is a flowchart showing an operation procedure of the infrared imaging device 100 according to the present embodiment. The first imaging unit 110 captures the far-infrared image (step B1). The far-infrared image captured by the first imaging unit 110 is output to the image processing device 210 from the image output unit 130, and is displayed on the image display device 220 provided in the vehicle 200 by the image processing device 210.

The control unit 19 (see FIG. 2) of the first imaging unit 110 determines whether or not the condition for performing the correction data acquisition processing is satisfied (step B2). In a case where the control unit determines that the condition for performing the correction data acquisition processing is not satisfied in step B2, the process returns to step B1, and the capturing of the far-infrared image is continued.

In a case where the control unit determines that the condition for performing the correction data acquisition processing is satisfied in step B2, the control unit 160 determines whether or not the second imaging unit 120 is irradiated with the near-infrared light based on the determination result in the light irradiation determination unit 150 (step B3). In a case where the control unit determines that the second imaging unit is irradiated with the near-infrared light in step B3, the first imaging unit 110 continuously captures the far-infrared image (step B4), and the captured far-infrared image is displayed on the image display device 220. The far-infrared image is continuously captured in the first imaging unit 110 until the control unit determines that the second imaging unit is not irradiated with the near-infrared light in step B3.

In a case where the control unit determines that the second imaging unit is not irradiated with the near-infrared light in step B3, the control unit 160 irradiates the capturing range of the second imaging unit 120 with the illumination light (near-infrared light) from the light irradiation unit 140 (step B5). The control unit 160 switches the image output by the image output unit 130 from the far-infrared image captured by the first imaging unit 110 to the near-infrared image captured by the second imaging unit 120 (step B6). The near-infrared image output from the image output unit 130 is output to the image processing device 210, and is displayed on the image display device 220 provided in the vehicle 200 by the image processing device 210. The processes from step B1 to step B6 may be the same as the processes from step A1 to step A6 shown in FIG. 6.

The control unit 160 instructs the first imaging unit 110 to perform the correction data acquisition processing. The first imaging unit 110 starts the correction data acquisition processing (step B7). For example, in step B7, the first imaging unit 110 sets the shutter 21 to be in the closed state by the shutter driving unit 20 (see FIG. 2), switches the selection of the switch 41 (see FIG. 3) from the unevenness correction unit 42 to the correction data acquisition unit 44, and causes the correction data acquisition unit 44 to start the correction data acquisition processing.

The control unit 160 determines whether or not the second imaging unit 120 is irradiated with the near-infrared light based on the determination result in the light irradiation determination unit 150 (step B8). In a case where the control unit determines that the second imaging unit 120 is not irradiated with the near-infrared light in step B8, the correction data acquisition processing is continued in the first imaging unit 110, and the capturing of the near-infrared image in the second imaging unit 120 is continued (step B9).

In a case where the control unit determines that the second imaging unit 120 is irradiated with the near-infrared light in step B8, the first imaging unit 110 stops (suspends) the correction data acquisition processing (step B10). For example, the first imaging unit 110 sets the shutter 21 to be in the opened state by the shutter driving unit 20, switches the selection of the switch 41 (see FIG. 3) from the correction data acquisition unit 44 to the unevenness correction unit 42, and causes the unevenness correction unit 42 to perform the unevenness correction processing.

In a case where the correction data acquisition processing is completed or the correction data acquisition processing is stopped, the control unit 160 returns the image output by the image output unit 130 from the near-infrared image to the far-infrared image. The control unit 160 causes the light irradiation unit 140 to stop the irradiation of the near-infrared light (step B11). It is preferable that a timing when the irradiation of the near-infrared light is stopped is a timing after the image output by the image output unit 130 is switched from the near-infrared image to the far-infrared image. After the irradiation of the near-infrared light from the light irradiation unit 140 is stopped, the process returns to step B1, and the capturing of the far-infrared image is continued.

In the present embodiment, the control unit determines whether or not the second imaging unit 120 is irradiated with the light for a period during which the correction data acquisition processing is performed. In a case where the second imaging unit 120 is irradiated with the light for a period during which the correction data acquisition processing is performed in the first imaging unit 110, the correction data acquisition processing is stopped, and the far-infrared image captured by the first imaging unit 110 is output to the image output unit 130. By doing this, after the correction data acquisition processing is started, in a case where there is a possibility that the person or the obstacle will not be noticed on the near-infrared image, it is possible to perform the monitoring by using the far-infrared image without waiting for the completion of the correction data acquisition processing. Other effects are the same as those of the first embodiment.

Although it has been described in the embodiments that the first imaging unit 110 has the shutter 21 and the correction data acquisition processing is performed in a state in which the shutter 21 is driven in the closed state, the correction data acquisition processing is not limited to the processing performed by driving the shutter in the closed state. For example, instead of performing the correction data acquisition processing by driving the shutter 21 in the closed state, the correction data acquisition processing may be performed by setting an optical system to be in an unfocusing state through the controlling of the image forming position using the optical system. In this case, the correction data acquisition processing may include processing for acquiring the correction data for correcting the unevenness between the pixels in a state in which the optical system is set in the unfocusing state.

Figure 8:
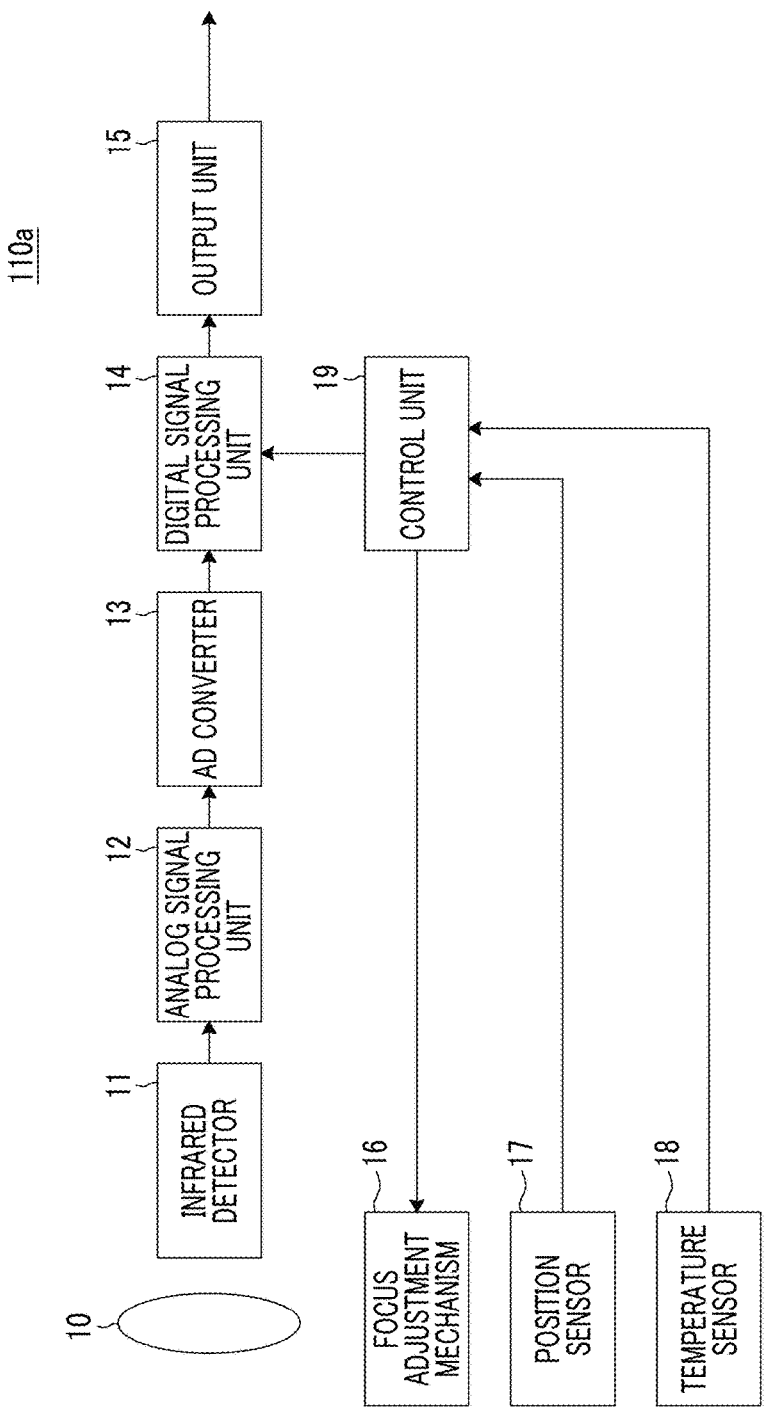
FIG. 8 is a block diagram showing a first imaging unit according to a modification example.

FIG. 8 shows a block diagram of a first imaging unit according to a modification example. A first imaging unit 110*a* according to the modification example has an optical system 10, an infrared detector 11, an analog signal processing unit 12, an AD converter 13, a digital signal processing unit 14, an output unit 15, a focus adjustment mechanism 16, a position sensor 17, a temperature sensor 18, and a control unit 19. The optical system 10, the infrared detector 11, the analog signal processing unit 12, the AD converter 13, the output unit 15, and the temperature sensor 18 may be the same as those described in the first embodiment.

The optical system 10 is an image forming optical system including one or more lenses. The optical system 10 may control the position (image forming position) of the image forming surface. The focus adjustment mechanism 16 adjusts a relative positional relationship between the optical system 10 and the infrared detector 11. Hereinafter, a case where the relative positional relationship between the optical system 10 and the infrared detector 11 is adjusted by changing the position of the optical system 10 will be described. For example, the focus adjustment mechanism 16 includes a motor that changes a position of a lens included in the optical system 10 and a driving circuit that drives the motor. The position sensor 17 detects the position of the lens included in the optical system 10. The position of the lens included in the optical system 10 is changed, and thus, the image forming position of the optical system 10 is changed.

The control unit 19 may function as a focus control unit that controls the image forming position of the optical system 10. The control unit 19 transmits a position signal for controlling the position of the optical system 10 to the focus adjustment mechanism 16. The focus adjustment mechanism 16 moves the optical system 10 to a position indicating the received position signal. In the normal capturing mode, the control unit 19 controls the position of the optical system 10 to a position in which the image forming surface of the optical system 10 matches a detection surface of the infrared detector 11 through the focus adjustment mechanism 16. In the normal capturing mode, the position of the optical system 10 may be changed according to the movement of a subject, or may be fixed to a certain position.

In an updating mode of the FPN data, the control unit 19 controls the position of the optical system 10 to a position in which the image forming surface of the optical system 10 does not match the detection surface of the infrared detector 11 through the focus adjustment mechanism 16. For example, the control unit 19 controls the position of the optical system 10 to a position in which the optical system 10 is in a focusing state in a case where the subject is closest to the optical system 10 or to a position in which the optical system 10 is in the focusing state in a case in which the subject is present in an infinite position.

Here, a state in which the image forming surface of the optical system 10 does not match the detection surface of the infrared detector 11 is referred to as the unfocusing state. That is, a state in which an image using the optical system 10 is not formed on the detector element of the infrared detector 11 is referred to as the unfocusing state. It is not necessary to set a state in which the image is not formed in the region of all the detector elements, and it is assumed that all the detector elements are in the unfocusing state even though the image is formed in a partial region. A state in which the image forming surface of the optical system 10 matches the detection surface of the infrared detector 11 is referred to as the focusing state. That is, a state in which the image using the optical system 10 is formed in the detector element of the infrared detector 11 is referred to as the focusing state. The image forming surface of the optical system 10 does not need to completely match the detection surface of the infrared detector 11, and the focusing state includes a state in which the subject is resolved on the detection surface of the infrared detector 11 to the extent that the subject is not able to be recognized.

In the normal capturing mode, the optical system 10 is controlled in the focusing state, and the amount of infrared rays incident on the detector elements is different depending on the image of the subject. In a case where the optical system 10 is in the unfocusing state, the image of the subject is formed in a position shifted from the detection surface of the infrared detector 11, and the subject is not resolved. Thus, the infrared image captured by the infrared detectors 11 is a blurry image, and the amount of infrared rays incident on the detector elements of the infrared detector 11 may be equalized.

In the present modification example, the correction data acquisition unit 44 acquires the correction data based on the infrared detection signals detected by the infrared detector 11 in a state in which the optical system 10 is controlled in the unfocusing state instead of acquiring the correction data based on the infrared detection signals detected by the infrared detector 11 in a state in which the shutter is in the closed state. The present modification example does not require the shutter and the driving circuit that drives the shutter, and has an advantage that the size of the first imaging unit 110 is reduced.

Although it has been described in the embodiments that the infrared imaging device 100 is mounted on the vehicle 200, the present invention is not limited thereto. The infrared imaging device 100 may be used for other purposes other than the monitoring of the region ahead of the vehicle in the vehicle 200. The image processing may be performed on the image output by the image output unit 130 in the image processing device 210. The image may be displayed on the image display device 220 and may be stored in an external storage device such as a hard disk device or a memory card. The image output unit 130 may transmit the image data to an external server or processing device through a network or a communication cable.

Although the present invention has been described based on preferred embodiments, an infrared imaging device, a control method, and a vehicle of the present invention are not limited to only the embodiments. Various modifications and changes from the configurations of the embodiments are included in the scope of the present invention.

EXPLANATION OF REFERENCES

10: imaging optical system
11: infrared detector
12: analog signal processing unit
13: AD converter
14: digital signal processing unit
15: output unit
16: focus adjustment mechanism
17: position sensor
18: temperature sensor
19: control unit
20: shutter driving unit
21: shutter
41: switch
42: unevenness correction unit
43: correction data storage unit
44: correction data acquisition unit
100: infrared imaging device
110: first imaging unit
120: second imaging unit
130: image output unit
140: light irradiation unit 150: light irradiation determination unit
160: control unit
200: vehicle
210: image processing device
220: image display device
IR: near-infrared light (illumination light)

What is claimed is:

1. An infrared imaging device comprising:
a first imaging unit that detects far-infrared rays, and captures a first image;
a second imaging unit that detects light having a wavelength range shorter than a wavelength range of the far-infrared rays, and captures a second image;
an unevenness correction unit that performs unevenness correction processing for correcting unevenness between pixels on the first image;
a correction data acquisition unit that performs correction data acquisition processing for acquiring correction data for correcting the unevenness;
a light irradiation determination unit that determines whether or not the second imaging unit is irradiated with the light having the wavelength range shorter than the wavelength range of the far-infrared rays; and
a control unit that causes the correction data acquisition unit to perform the correction data acquisition processing in a case where the light irradiation determination unit determines that the second imaging unit is not irradiated with the light having the wavelength range shorter than the wavelength range of the far-infrared rays
wherein the control unit stops the correction data acquisition processing in a case where the light irradiation determination unit determines that the second imaging unit is irradiated with the light having the wavelength range shorter than the wavelength range of the far-infrared rays before the correction data acquisition processing is completed.

2. The infrared imaging device according to claim 1,
wherein the second imaging unit detects at least one of light having a wavelength range of near-infrared rays or light having a wavelength range of visible light rays.

3. The infrared imaging device according to claim 1, further comprising:
a light irradiation unit that irradiates a capturing range of the second imaging unit with illumination light having a wavelength included in the wavelength range detected in the second imaging unit.

4. The infrared imaging device according to claim 2, further comprising:
a light irradiation unit that irradiates a capturing range of the second imaging unit with illumination light having a wavelength included in the wavelength range detected in the second imaging unit.

5. The infrared imaging device according to claim 3,
wherein the control unit controls the light irradiation unit to irradiate the capturing range of the second imaging unit with the illumination light for a period during which the correction data acquisition unit performs the correction data acquisition processing.

6. The infrared imaging device according to claim 1,
wherein the first imaging unit includes a shutter that blocks light having the wavelength range of the far-infrared rays incident from an outside, and
the control unit controls the shutter to block the light having the wavelength range of the far-infrared rays in a case where the correction data acquisition processing is performed by the correction data acquisition unit.

7. The infrared imaging device according to claim 2,
wherein the first imaging unit includes a shutter that blocks light having the wavelength range of the far-infrared rays incident from an outside, and
the control unit controls the shutter to block the light having the wavelength range of the far-infrared rays in a case where the correction data acquisition processing is performed by the correction data acquisition unit.

8. The infrared imaging device according to claim 3,
wherein the first imaging unit includes a shutter that blocks light having the wavelength range of the far-infrared rays incident from an outside, and
the control unit controls the shutter to block the light having the wavelength range of the far-infrared rays in a case where the correction data acquisition processing is performed by the correction data acquisition unit.

9. The infrared imaging device according to claim 6,
wherein the correction data acquisition processing includes acquiring the correction data in a state in which the shutter blocks the light having the wavelength range of the far-infrared rays.

10. The infrared imaging device according to claim 1,
wherein the first imaging unit includes an optical system that is able to control an image forming position of a subject, and
the control unit controls an image forming position using the optical system such that the optical system is in an unfocusing state in a case where the correction data acquisition processing is performed by the correction data acquisition unit.

11. The infrared imaging device according to claim 10,
wherein the correction data acquisition processing includes acquiring the correction data in a state in which the optical system is in the unfocusing state.

12. The infrared imaging device according to claim 1,
wherein at least parts of a capturing range of the first imaging unit and a capturing range of the second imaging unit overlap each other, and
the infrared imaging device further comprises an image output unit that outputs at least the first image in a case where the correction data acquisition processing is not performed by the correction data acquisition unit, and outputs the second image in a case where the correction data acquisition processing is performed by the correction data acquisition unit.

13. The infrared imaging device according to claim 1, further comprising:
a condition determination unit that determines whether or not a condition for performing the correction data acquisition processing is satisfied,
wherein the control unit causes the correction data acquisition unit to perform the correction data acquisition processing in a case where the condition determination unit determines that the condition is satisfied and the light irradiation determination unit determines that the second imaging unit is not irradiated with the light having the wavelength range shorter than the wavelength range of the far-infrared rays.

14. The infrared imaging device according to claim 13, further comprising:
a temperature measurement unit that measures a temperature,
wherein the condition determination unit determines that the condition is satisfied in a case where a difference between a temperature measured by the temperature measurement unit and a temperature at a point of time when previous correction data acquisition processing is performed is equal to or greater than a temperature threshold value.

15. The infrared imaging device according to claim 13, wherein the condition determination unit determines that the condition is satisfied in a case where a time elapsed after a point of time when the previous correction data acquisition processing is performed is equal to or greater than a time threshold value.

16. The infrared imaging device according to claim 1, wherein the light irradiation determination unit determines whether or not the second imaging unit is irradiated with the light having the wavelength range shorter than the wavelength range of the far-infrared rays based on the second image captured by the second imaging unit.

17. The infrared imaging device according to claim 1, further comprising:
   a light sensor that detects irradiation of the light having the wavelength range shorter than the wavelength range of the far-infrared rays,
   wherein the light irradiation determination unit determines whether or not the second imaging unit is irradiated with the light having the wavelength range shorter than the wavelength range of the far-infrared rays based on an output signal of the light sensor.

18. A vehicle comprising the infrared imaging device according to claim 1.

19. The vehicle according to claim 18,
   wherein the first imaging unit and the second imaging unit capture a video of a region ahead of the vehicle.

20. A control method of an infrared imaging device that includes a first imaging unit which detects far-infrared rays and captures a first image and a second imaging unit which detects light having a wavelength range shorter a wavelength range of the far-infrared rays and captures a second image, the method comprising:
   a step of determining whether or not the light having the wavelength range shorter than the wavelength range of the far-infrared rays is applied; and
   a step of acquiring correction data for correcting unevenness between pixels on the first image in a case where it is determined that the light having the wavelength range shorter than the wavelength range of the far-infrared rays is not applied
   wherein in the step of determining whether or not the light having the wavelength range shorter than the wavelength range of the far-infrared rays is applied, stopping the correction data acquisition processing in a case where the second imaging unit is irradiated with the light having the wavelength range shorter than the wavelength range of the far-infrared rays before the step of acquiring correction data is completed.

* * * * *